Nov. 18, 1930.  J. WERLICH  1,782,330
CHILD'S WAGON.
Filed May 18, 1929
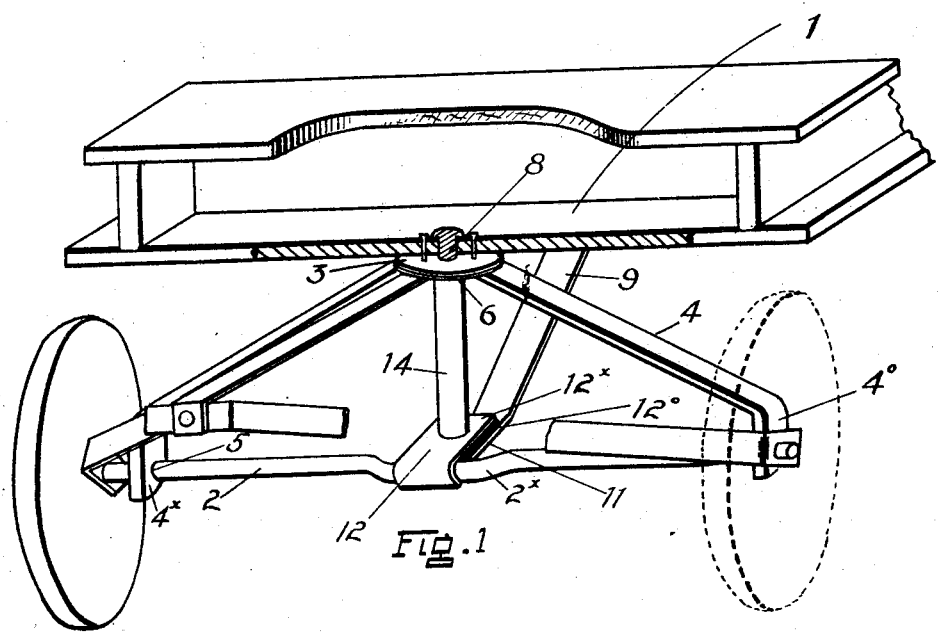
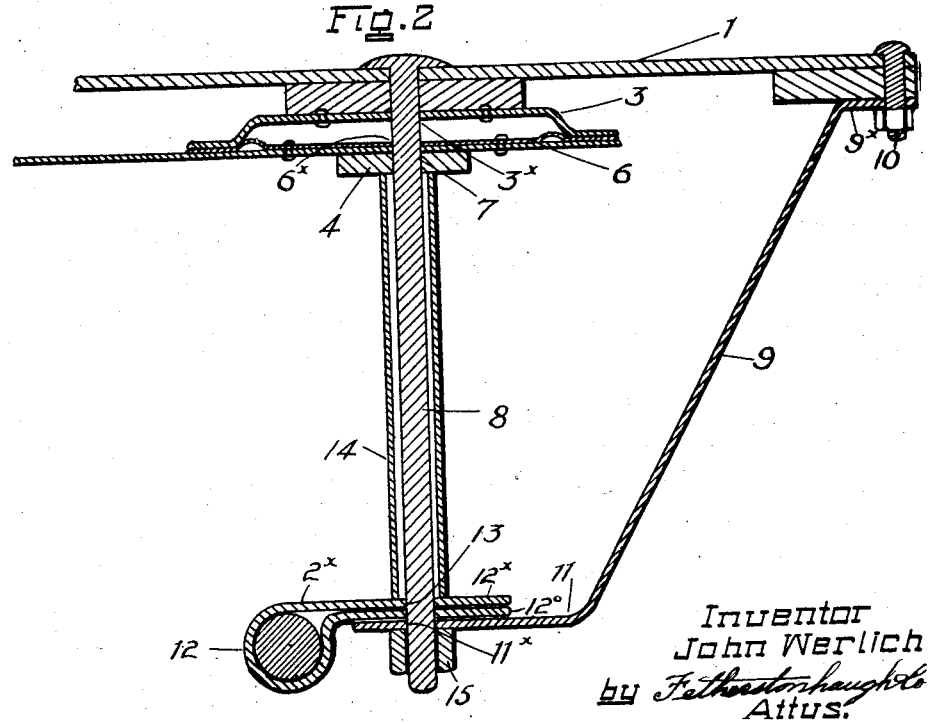
Inventor
John Werlich
by Fetherstonhaugh & Co.
Attys.

Patented Nov. 18, 1930

1,782,330

UNITED STATES PATENT OFFICE

JOHN WERLICH, OF PRESTON, ONTARIO, CANADA

CHILD'S WAGON

Application filed May 18, 1929. Serial No. 364,133.

My invention relates to improvements in children's wagons and the object of the invention is to so construct the front gear of the wagon as to avoid weakening the front axle without lessening the rigidity of the gear, and it consists essentially of a centre member forming a suitably braced king pin or post and an axle having a central portion located out of vertical alignment with the post, and a clip bracket rigidly connecting the lower end of the post and central portion of the axle together as hereinafter more particularly explained.

Fig. 1 is a perspective view of a front portion of a wagon showing my gear applied thereto.

Fig. 2 is a transverse sectional view through the centre of the gear.

In the drawing like characters of reference indicate corresponding parts in each figure.

1 indicates the body of the wagon. 2 is the front axle provided centrally with an offset portion $2^x$. 3 is the fifth wheel which is secured in a stationary position to the wagon body 1 and is provided with a central orifice $3^x$. 4 is an arch brace provided with end portions $4^x$ and $4^o$ having orifices 5 through which the axle 2 extends in proximity to its ends. 6 is the lower portion of the fifth wheel 3. The portion 6 is rigidly secured to the front hound brace $4^1$ and is provided with a central orifice $6^x$ in vertical alignment with the orifice $3^x$.

7 is an orifice in the arch support 4 in vertical alignment with the orifices $3^x$ and $6^x$. 8 is the king bolt or pin which extends through the bottom of the wagon body 1 depending therefrom through the orifices $3^x$, $6^x$ and 7 passing downward through a point in alignment with the longitudinal centre of the axle 2. 9 is a strap brace the body of which extends in an inclined direction from the lower end of the bolt 8 to the bottom of the wagon body, the upper end of the strap being bent as indicated at $9^x$ so as to be secured to such body by a bolt 10. The opposite or lower end is bent at 11 and is provided with an orifice $11^x$ through which the lower end of the bolt 8 also extends, 12 is a clip bracket which is bent around the offset portion $2^x$ of the axle 2, the ends $12^x$ and $12^o$ lying one over the other and upon the turned portion 11 of the strap 9.

The overlying portions $12^x$ and $12^o$ are provided with vertically aligned orifices 13 through which the bolt 8 extends.

14 is a spacing sleeve extending around the bolt 8 between the clip bracket 12 and the arch brace 4, and thereby forming a depending post member around which the gear swings in a horizontal plane. 15 is a nut screwed onto the lower end of the bolt 8 against the lower face of the portion 11 of the strap 9, and thereby turnably supporting the axle and arch brace upon the bolt 8.

By this construction it will be seen that a rigid support is provided for the axle permitting the axle to be swung around its true centre without necessitating the boring of the axle and the consequent weakening thereof, and yet at the same time providing a construction which is rigid, strong and durable.

What I claim as my invention is:—

In a wagon, the combination with a wagon body having a fifth wheel member secured to the end face thereof, a transverse bolster bar, a fifth wheel member secured to the bolster bar in contact with the aforesaid fifth wheel member said bolster bar having vertical ends, an axle extending diametrically of the fifth wheel and at its ends through the vertical portions of the bolster, and having a central portion offset, a bolt extending through the wagon body and members of the fifth wheel bolster and depending at its lower end in central alignment with the axle, a clip extending around the offset portion of the axle and through which the bolt also extends, a brace extending from the clip rearwardly to the body of the wagon, and a spacing sleeve extending between the fifth wheel and the clip.

JOHN WERLICH.